May 27, 1947.　　　H. G. HOFFER　　　2,421,065
DEVICE FOR SHAPING LENSES
Filed Feb. 25, 1944
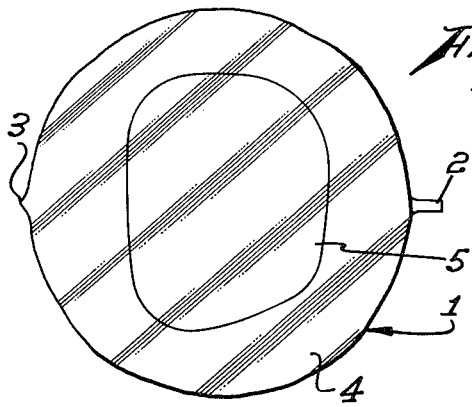
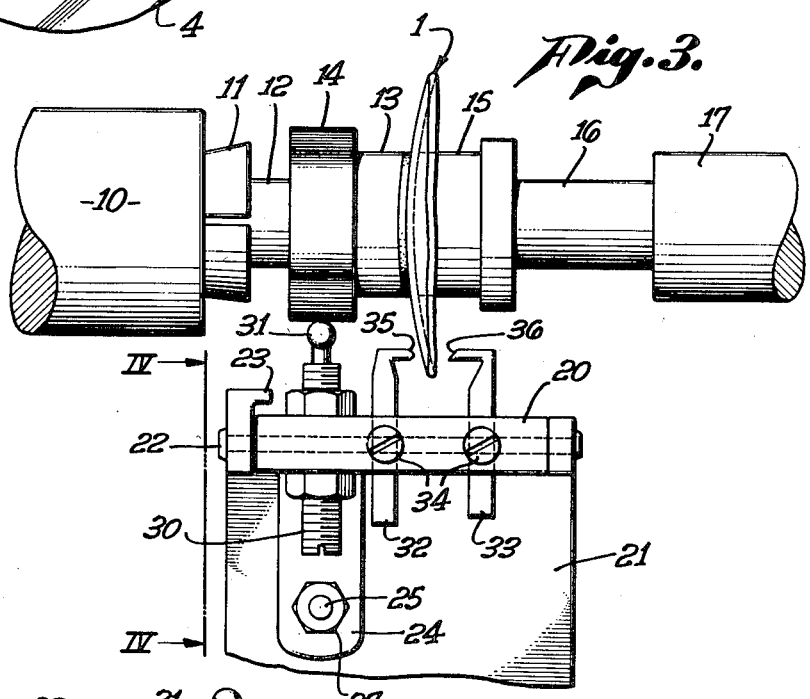
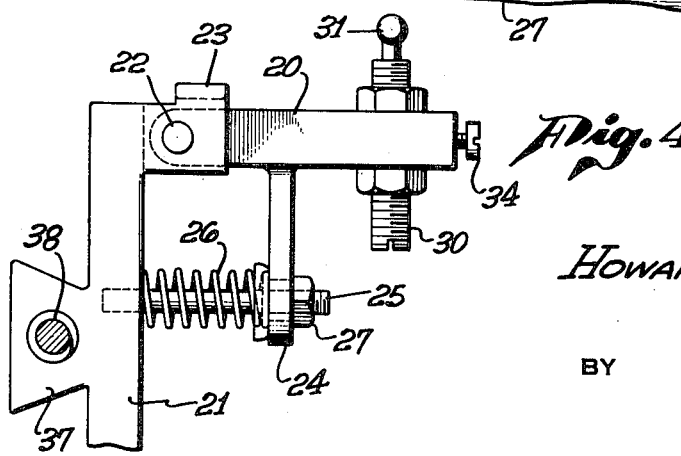
Howard G. Hoffer,
INVENTOR.
BY
ATTORNEY.

Patented May 27, 1947

2,421,065

UNITED STATES PATENT OFFICE 2,421,065

DEVICE FOR SHAPING LENSES

Howard G. Hoffer, Santa Monica, Calif.

Application February 25, 1944, Serial No. 523,945

4 Claims. (Cl. 82—19)

This invention is directed towards improved means for and methods of shaping and edging lenses, particularly ophthalmic lenses. The methods and devices are especially adapted to be used in the shaping and edging of lenses made from organic plastics.

As is well known, lenses are generally ground or formed as circular blanks. After suitable dioptric surfaces have been imparted to these blanks, the edges are ground so as to give the blank a desired configuration. Thereafter the edges are beveled or edged so as to permit the lens to be received by the mount or to be coated with a black enamel so as to prevent internal reflections, and for other purposes. These grinding and edging operations have been very time-consuming. Moreover, it is difficult to attain the desired configuration or shape in the finished lens. Furthermore, dust problems are created, such dust arising from the grinding operation. When the blanks are made of an organic plastic, a great deal of valuable plastic is converted into useless powder mixed with the grit from the grinding wheels.

The present invention is particularly directed to means and methods of shaping and edging lenses made from organic plastics. By the term "organic plastics" as used herein, reference is made to the various thermo-setting and thermoplastic organic compounds and resinous substances such as the polystyrenes, plastics of methacrylate type, vinyl type, and other polymerization and condensation products having the desired transparency, transmission and absorption characteristics.

The method of the present invention not only greatly expedites the shaping and edging of lenses but permits the recovery of large quantities of the plastic for reuse. Moreover, the method of the invention permits a more accurate positioning of the principal meridian of the lens blank so that the ophthalmic lens exerts its proper and desired correction.

Generally stated, the method of this invention may include the formation of a lens blank by molding, pressing or the like so as to form a substantially circular blank having desired dioptric surfaces. The blank may carry indicia correlated to the principal meridian of the lens. This lens blank is then centered upon a rotatable block provided with an axially disposed pattern cam. The cam may carry a meridian mark and such meridian mark may be correlated with the indicia of the blank. A lens is then cut out of this blank and the lens is simultaneously edged, beveled or provided with the desired edge pattern, by rotating the lens blank and pattern cam and cutting the blank by means of a sharp pointed tool brought in contact with the surface of the blank, the distance between the cutting tool and the axis of rotation being controlled in accordance with the pattern cam.

In this manner, a substantially circular edge portion of the blank is removed as a unit, this circular portion being capable of reuse in the molding or other forming operation.

The tools and their holder are preferably provided with a cam follower which is yieldably urged against the pattern cam, the entire tool holder being capable of movement in a direction parallel to the axis of rotation of the lens blank.

It is an object of the present invention, therefore, to disclose and provide a method of shaping lenses made of an organic plastic.

Another object of the invention is to disclose and provide a method of simultaneously shaping and edging ophthalmic lenses.

A still further object of the invention is to disclose and provide means and methods whereby lens blanks may be shaped or trimmed to a desired configuration in a simple, effective, reproducible and rapid manner.

These and other objects and advantages of the invention will become apparent to those skilled in the art from the following detailed description of certain exemplary forms in which the invention may be embodied, and their methods of use.

In order to permit the invention to be readily understood, reference will be had to the appended drawings, in which:

Fig. 1 is a plan view of an ophthalmic lens and the lens blank from which it is cut.

Fig. 2 is a side elevation of the ophthalmic lens shown in Fig. 1.

Fig. 3 is a plan view of an exemplary arrangement of means whereby the method of the invention may be carried out.

Fig. 4 is a transverse section taken along the plane IV—IV of Fig. 3.

As previously stated, the lens blanks are preferably made by pressure forming or injection molding and ordinarily result in a circular blank, generally indicated at 1, having curved surfaces so that the lens has the required contour. In the event the lens is corrected for aberration, astigmatism or has any other major or principal meridian, the lens blank may be provided with indicia correlated to the principal meridian of the lens or to the principal cylindrical axis of the lens. These indicia may take the form of marks molded into the surface of the lens blank, or the sprue 2 may form one of the marks while a small pointed portion 3 may represent another mark establishing the principal meridian of the lens.

Ophthalmic lenses may be cut to a variety of shapes, such as round, oval, leaf, clover, etc. A lens of one shape is shown in full lines at 5. The side elevation of this lens 5 appears in Fig. 2 and as there shown the edge of the lens is beveled as indicated at 6.

Heretofore difficulty has been experienced in making certain that the principal axis or meridian of the lens was correctly positioned with respect to the contours of the lens. Moreover, a great deal of time was consumed in grinding away the annular portion 4 between the outer edges of the lens blank and the outer edges of the lens 5. Obviously, the grindings or residue obtained by grinding away the material 4 could not be recovered because of the presence of fine particles from the grinding wheels. In accordance with my method, the grinding operation is eliminated and it is possible to recover all of the material 4 so that it can be reused in either producing additional lenses or in other molding operations.

A simple but effective device for carrying out the method of the present invention is illustrated in Figs. 3 and 4. In these drawings, a rotating spindle is indicated at 10, said spindle being provided with a collet 11 adapted to receive the shank 12 of a chuck or block 13 provided with a rubber or other resilient surface adapted to contact the surface of the lens blank 1 without scratching or marring its finish. The lens blank 1 may be centered upon the block 13 and attached thereto with any of the well known cements, pitches, rosins, resins, bituminous compounds or the like. Instead of being attached to the block 13, the lens 1 may be attached to the block 15 carried by the spindle 16 of a tail stock 17. By "centering," reference is made to the operation of so placing the blank 1 between the blocks 13 and 15 that the optical center of the blank is virtually intersected by the axis of rotation of the spindle 12. The spindle 16 may exert a yielding pressure against the lens 1 so as to hold the lens 1 for rotation with the spindles 12 and 16. In some instances it may be desired to have the block 15 rotate independently of the spindle 16.

Mounted for rotation about the axis of the spindle 12 and preferably a part of the spindle 12 and the block 13 is a pattern cam 14. This pattern cam 14, in transverse section, has a contour identical to that which it is desired to reproduce in the lens. For example, if the lens to be cut from the blank 1 is to have the contour of the lens 5 shown in Fig. 1, then the pattern cam 14 would have a contour identical to that of the lens 5.

Adjacent the spindle of the device is a tool holder 20 adapted to move toward and away from the axis of rotation of the lens supports or blocks. The tool holder 20 may be carried by a body member or carriage 21 and pivoted thereto as at 22. The body member or carriage 21 may be provided with a stop 23 adapted to limit the forward motion of the tool holder 20.

The tool holder 20 may also be provided with a rearwardly extending arm 24 provided with a bore through which a bolt 25 extends, a spring 26 surrounding the bolt 25 and pressing upwardly against the arm 24. The lower end of the bolt 25 may be threaded into a socket formed in the body 21 whereas the upper part of the bolt may be provided with an adjustment nut 27.

The tool holder 20 may carry a cam follower which may consist of a screw 30 provided with a ball end 31 adapted to ride upon the surface of the pattern cam 14. The screw 30 may pass through the tool holder 20 and be locked in position by means of suitable lock nuts. The tool holder 20 may also carry one or more cutting tools, such as the cutting tools 32 and 33 extending through suitable ports in the tool holder 20 and locked therein as by means of the fillister head set screws 34. The tools 32 and 33 are preferably provided with suitably contoured pointed ends, as indicated at 35 and 36. Means are provided for moving the entire tool holder 20 as well as the body 21 in a direction parallel to the axis of rotation of the lens blank 1, such as, for example, the dovetail 37 and feed screw 38.

After the lens blank 1 has been properly positioned between the blocks 13 and 15, the tool holder 20 is brought into position with the cam follower 31 in pressure contact with the surface of the pattern cam 14. The tool holder 20 is then moved in a direction parallel to the axis of rotation of the lens blank so as to bring the point of a tool, such as the point 35 of the tool 33, into contact with the surface of the lens blank. Since the lens blank and pattern cam are rotating and the tool holder 21 is moved toward and away from the axis of rotation in accordance with the contours of the pattern cam 14, the tool 32 will cut from the lens blank 1 a lens having the desired contour. If a pointed or wedge-shaped cutter 35 is employed, the cut will simultaneously edge the lens. The tool 32 may be used in cutting part way through the lens blank 1, whereupon the tool holder 20 may be moved in the opposite direction so as to bring the tool 33 into contact with the lens blank, thereby completing the cut from opposite sides of the lens blank and beveling the edges of the resulting lens at the same time.

An annular piece 4 is thus removed from the lens blank, this piece being capable of reuse in subsequent molding operations.

It will be evident to those skilled in the art that the tool holder 20 may be yieldably urged against the pattern cam by a variety of different mechanical arrangements. Moreover, the design, shape and size of the cutting tools 32 and 33 may be appreciably varied, depending upon the shape of the edge which it is desired to impart to the finished lens. All changes and modifications coming within the scope of the appended claims are embraced thereby.

I claim:

1. An apparatus for simultaneously cutting out and edging lenses made from an organic plastic comprising a rotatable spindle having a pattern cam thereon defining an eccentric cam face of substantial breadth, means for holding a lens blank larger in diameter than the pattern cam for rotation by said spindle, an axially reciprocating body member, a tool holder pivotally mounted thereon, a spring holder and a spring between the holder and the body member biased to urge the tool holder toward the spindle, an adjustable cam follower on the tool holder having a path of movement simultaneously around and across said cam face and a cutting tool on the tool holder movable in a path defined by the travel of the cam follower adapted to simultaneously remove the outer portion of the lens blank and bevel the outer edge of said lens.

2. An apparatus for simultaneously cutting out and edging lenses comprising a rotatable spindle having a pattern cam thereon defining a circumferential cam face of substantial breadth, means for holding a lens blank for rotation by said spindle, an axially reciprocating body member, a tool holder pivotally mounted thereon, a spring holder and a spring between the holder and the body member biased to urge the tool holder toward the spindle, a cam follower on the tool holder having a path of movement simultaneously around and across said cam face and a cutting tool on the tool holder movable in a path defined by the travel of the cam follower adapted to simultaneously size and bevel the outer edge of said lens.

3. In an apparatus for simultaneously shaping and edging lenses made from an organic plastic: a rotatable spindle provided with a pattern cam having a circumferential face of substantial width; means for holding a lens blank for rotation by the spindle; a tool carriage movable in directions parallel to the axis of the spindle; a tool holder pivotally mounted on the tool carriage, said tool holder carrying a pattern cam follower and a cutting tool provided with a tapering point adapted to engage a face of the lens blank; spring means carried by the tool carriage for yieldably urging the tool holder and follower carried thereby toward the axis of the spindle to maintain the follower in contact with the pattern cam; and means for moving the tool carriage and holder in a direction parallel to the axis of the spindle to bring the point of the tool into contact with the side face of a lens blank held and rotated by the spindle.

4. An apparatus for simultaneously cutting out and edging lenses from a lens blank comprising: a rotatable spindle having a pattern cam thereon provided with an eccentric cam face of substantial breadth; means for holding a lens blank larger in diameter than the pattern cam for rotation by the spindle; an axially movable tool carriage; a tool holder pivotally mounted on said carriage, said tool holder carrying a pattern cam follower having a path of movement around and across the face of the pattern cam and a tool having a cutting end portion extending in a direction virtually parallel to the axis of the spindle; spring means carried by the carriage for yieldably urging the tool holder and follower toward the axis of the spindle to maintain the follower in contact with the pattern cam; stop means carried by the carriage and engageable by the tool holder for limiting the spring urged movement of the tool holder; and means for moving the tool carriage and holder carried thereby in a direction parallel to the axis of the spindle to bring the cutting end portion of the tool into contact with the side face of a lens blank held and rotated by the spindle.

HOWARD G. HOFFER.

REFERENCES CITED

The following references are of record in the file of this patent:

UNITED STATES PATENTS

| Number | Name | Date |
| --- | --- | --- |
| 699,382 | Gallagher | May 6, 1902 |
| 280,259 | Stevens et al. | June 26, 1883 |
| 499,977 | Fellows | June 20, 1893 |
| 602,062 | Echols | Apr. 12, 1898 |
| 690,763 | Parker | Jan. 7, 1902 |
| 400,882 | Tower | Apr. 2, 1889 |
| 649,905 | Brophy | May 22, 1900 |

FOREIGN PATENTS

| Number | Country | Date |
| --- | --- | --- |
| 612,041 | France | Oct. 15, 1926 |